United States Patent [19]

Härdmark

[11] Patent Number: 4,621,712

[45] Date of Patent: Nov. 11, 1986

[54] ANTI-SKID DEVICE FOR MOTOR VEHICLES

[75] Inventor: Ragnar Härdmark, Linköping, Sweden

[73] Assignee: Onspot AB, Linköping, Sweden

[21] Appl. No.: 690,003

[22] Filed: Jan. 9, 1985

[30] Foreign Application Priority Data

Jan. 17, 1984 [SE] Sweden ............................... 8400204

[51] Int. Cl.⁴ ............................................... B60T 1/04
[52] U.S. Cl. .................................... 188/4 B; 152/208; 152/231; 152/243
[58] Field of Search ............... 152/208, 231, 233, 214, 152/215, 216, 213 R, 246, 213 A, 323, 243; 188/4 R, 4 B; 180/16; 301/42, 65, 63 DS

[56] References Cited

U.S. PATENT DOCUMENTS

| | | | |
|---|---|---|---|
| 1,381,001 | 6/1921 | Norman | 188/4 B |
| 3,796,246 | 3/1974 | Walenta | 152/243 X |
| 4,299,310 | 11/1981 | Törnebäck | 152/208 X |
| 4,487,456 | 12/1984 | Zulauf | 301/65 X |

*Primary Examiner*—Edward Kimlin
*Assistant Examiner*—Thomas Bokan
*Attorney, Agent, or Firm*—George H. Mortimer

[57] ABSTRACT

A cast, low density metal disk for anti-skid devices which has a periphery of sufficiently small width that when it contacts the wet side wall of a tire on a vehicle it spreads the film of water to each side and leaves an essentially dry area of contact between the disk and the tire instead of hydroplaning on it. The periphery preferably is covered with an anti-skid material, e.g., rubber. Chains are pre-turned or twisted in the same direction a tire tends to turn them when rolling over them to avoid further twisting with consequent shortening in use and they are given a non-circular, e.g., square cross section to increase their anti-skid properties. The chains are welded at one end to a steel ring which is removably fastened to the under surface of a disk by bolts.

14 Claims, 5 Drawing Figures

ANTI-SKID DEVICE FOR MOTOR VEHICLES

INTRODUCTION

The present invention relates to an improved anti-skid device for motor vehicles and, more particularly, to the type which comprises means for continuously throwing short pieces of chain under a vehicle wheel as the vehicle is moving over a slippery surface, e.g., a snow covered roadway. A preferred embodiment of the invention comprises a wheel or disk that is mounted on the frame of a vehicle for movement from an inactive position to an active position in contact with the side wall of a tire on a vehicle wheel to cause it to rotate and throw the lengths of chain, which are secured at one end to the disk, between the vehicle wheel and the supporting surface. The invention provides improved means (a) for transmitting the rotary movement of a tire on the wheel of a vehicle to the chain-carrying disk without aquaplaning, (b) for preventing sidewise movement of a tire due to the chain shortening when the tire rolls over it, and (c) for increasing traction.

BACKGROUND OF THE INVENTION

The basic principle of anti-skid devices of the type involved in the present invention has, despite the fact that it was proposed long ago, been difficult to realize in practice because of the drawbacks and disadvantages from which the previously known devices have suffered. One such drawback arises from the fact that a slippery surface often is wet with water which causes a film of water to form on the side walls of the tires on a vehicle moving over the surface. When the chain-carrying disk is brought into contact with the wet side wall of the tire, rotation is not achieved because of aquaplaning. Another such drawback results from a shortening of the chains as they are rotated while between the moving tire and the slippery surface which causes stability disturbances for the vehicle. A further disadvantage is that the projection of the periphery of the chain links is generally circular in cross section which is the shape having minimum anti-skid properties. A still further drawback is that the means for fastening the ends of chains to the rotatable disk or wheel is frequently insecure because of difficulties in welding steel to low density metal alloys, such as aluminum and magnesium base alloys, which are preferred metals from which to cast the disks.

SUMMARY OF THE INVENTION

The present invention has as an object the elimination of the above-mentioned drawbacks and disadvantages with a relatively simple and low cost construction. A further object is to provide such a device that enables simple change of worn parts. The aquaplaning problem is solved in accordance with the invention by making the periphery of the chain carrying disk which contacts the wet side wall of a tire of sufficiently narrow width or radius in cross section that it presses the film of water aside instead of rolling (aquaplaning) over it. The solution to the chain shortening problem is achieved by providing chains having a preset turn in the same direction that the tire tends to turn it in rolling over the chain between it and the supporting surface. Preferably the preturned chain is non-circular in cross section, e.g., square. The simple change of worn parts is achieved by securing one end of each chain to a ring, e.g., by welding the ends to a steel ring, and fastening the ring to the disk by bolts or the like.

BRIEF DESCRIPTION OF THE DRAWINGS

The invention will be disclosed in conjunction with the drawings in which.

DETAILED DESCRIPTION OF THE INVENTION

The anti-skid device of the present invention comprises a chain-carrying disk with a sufficiently narrow periphery to split or press aside a film of water on the side wall of the tire it contacts instead of rolling or sliding over the film of water (aquaplaning). The chains are preferably (a) non-circular in cross section for more efficient anti-skidding properties, (b) preturned or twisted in the same direction the tire would tend to turn or twist them in rolling over them on the supporting surface, and (c) fastened at one end, e.g., by welding, to a readily replaceable ring, e.g., of steel, which is removably secured to the disk.

Figure 1:
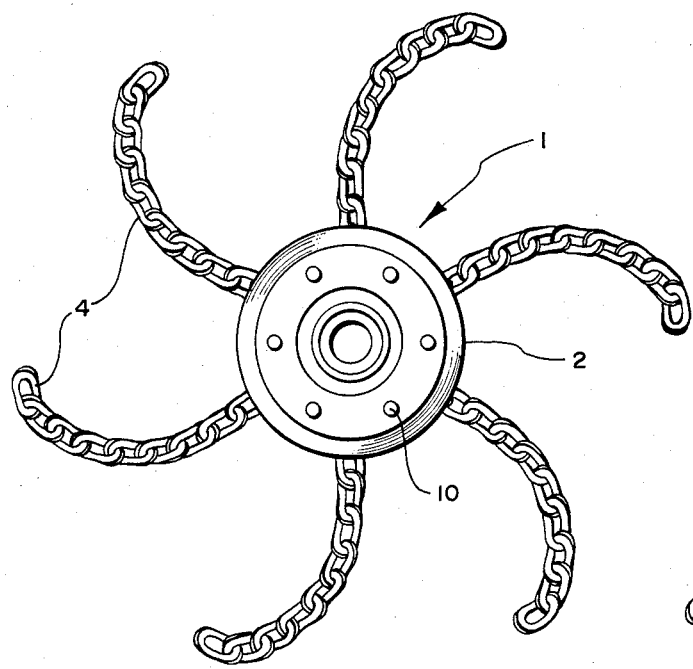
FIG. 1 is a perspective view from above of a disk made in accordance with a preferred embodiment of the invention.
Figure 3:
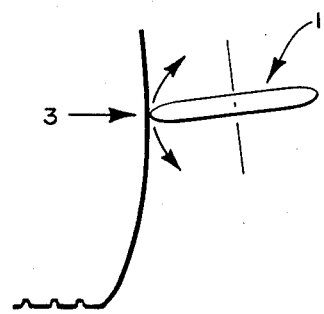
FIG. 3 is a schematic representation of the contact of the periphery of a disk made in accordance with the invention with a wet side wall of a tire, the arrows representing the splitting or pushing aside of the film of water to give almost dry engagement of the disk with the tire wall.
Figure 5:
FIG. 5 is a fragmentary cross-section of the periphery of the disk.

Referring now to FIG. 1 of the drawing, the chain carrying disk 1 is provided around its periphery or circumference with an edge or peripheral cover 2. The disk 1 is preferably made of low density cast metal, e.g., an aluminum or magnesium base alloy, and its periphery is of sufficiently narrow width or short radius in cross section that when it is rotated by contact with the wet side wall of a tire on a moving vehicle, as at 3, it will split or press aside the film of water, partly upwardly and partly downwardly as schematically illustrated in FIG. 3, leaving an essentially dry surface contact of the disk with the tire side wall. As shown in FIG. 5, the relatively thin peripheral edge of disk 1, preferably of semi-circular shape of small diameter in cross-section, is connected by a diverging section having sloping, preferably arcuate, surfaces connecting it to the central portion of the disk to which ring 7 is removably fastened, as described hereinafter. The cover 2, which may be provided to increase the friction between the disk and the side wall of the tire, may be made of any suitable material, preferably of rubber or resilient plastic that can be stretched to place it on the disk and then tightly grip the periphery to prevent slippage between it and the disk. It may also be made of a suitable length of non-resilient material by adhesively securing it to the disk with any suitable adhesive which is not soluble in the moisture encountered in use.

Figure 2:
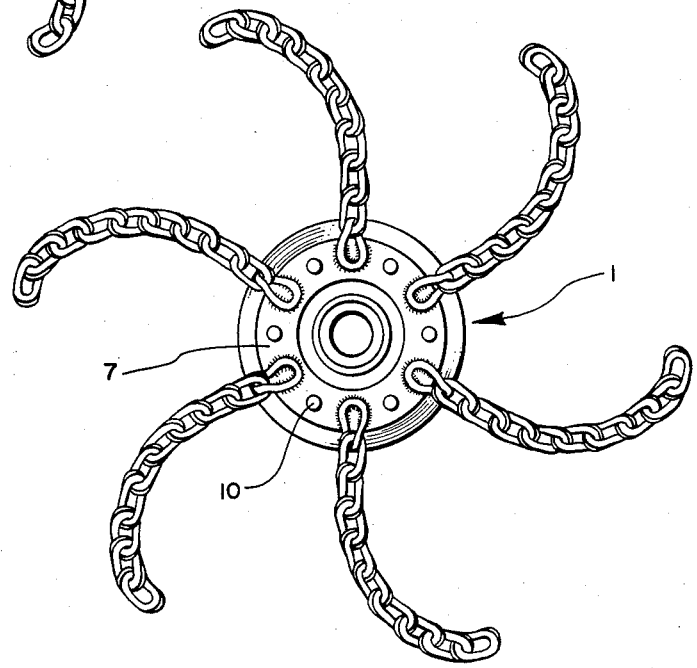
FIG. 2 is a perspective view of the same disk seen obliquely from below.

One end of each of a plurality of chains 4, e.g., six (6), is secured to the disk 1. The chains are preferable substantially equally spaced around the circumference, as shown in FIGS. 1 and 2. A preferred manner of securing an end of each chain to the disk is illustrated in FIG.

2 in which reference number 7 identifies a ring, e.g., of steel, to which the chain ends are fastened, preferably by welding, and the ring is then fastened by means 10, e.g., bolts, rivets, or the like, to the disk 1.

Figure 4:
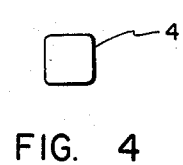
FIG. 4 is an end view of the outline of the periphery of the chain.

Either before or after the chains 4 are attached to the ring 7, they are preferably turned or twisted in the direction in which they tend to be turned when the tire rolls over them after they are thrown into the space between the rotating tire and its supporting surface. This has a number of advantages. One advantage is that a pre-turned chain is not shortened as a tire rolls over it, thus eliminating the stability disturbances heretofore experienced with known devices of this type. The chains are also preferably deformed so that the cross-section is non-circular, e.g., square as shown in FIG. 4. The non-circular shape promotes better anti-skid properties on slippery surfaces.

The preferred construction, using ring 7 with each disk, avoids the difficulty of welding chains to low density alloys of compositions preferably used for casting the disks. In any event, there must be means for moving the disk and associated parts around the oscillatable connection to the vehicle from its active position in contact with the side wall of the adjacent tire to a forward, lifted, inactive position and back again to the active position. The means for effecting this movement preferably is operable from a remote location, e.g., near the driver of the vehicle.

Although the invention has been described and illustrated in relation to the best presently known embodiment of it, those skilled in the art will recognize that modifications and variations may be made without departing from the spirit and scope of the invention as set forth in the following claims.

Having thus described and illustrated the invention, what is claimed is:

1. In an anti-skid device of the type which comprises a disk having a plurality of chains attached at one end thereto adapted to be thrown sequentially into the space between the rotating tire of the vehicle and the supporting surface as the disk is driven by contact with the side wall of the tire so that each chain comes between the tire and the surface to diminish skidding of the tire on the surface, the improvement which comprises a disk having the periphery which contacts the side wall of a tire of sufficiently narrow width to split a layer of water on the side wall and provide essentially dry, non-slipping contact of the periphery of the disk with the side wall of the tire instead of hydroplaning on it, said periphery being semicircular and connected by a diverging section having sloping upper and lower surfaces connecting it to the central portion of the disk to which the chains are attached at one end.

2. In an anti-skid device as set forth in claim 1 in which the disk is cast low density metal and the periphery has a cover of anti-skid material.

3. In an anti-skid device as set forth in claim 2 in which each link of the chain is twisted in the same direction in which an adjacent tire would twist sufficiently it in use to substantially prevent further twisting as a tire rolls over it.

4. In an anti-skid device as set forth in claim 1 in which each link of the chain is twisted sufficiently in the same direction in which an adjacent tire would twist it in use to substantially prevent further twisting as a tire rolls over it.

5. In an anti-skid device as set forth in claim 4 in which each chain is welded at one end to a ring which is fastened to the underside of the disk.

6. In an anti-skid device of the type which comprises a disk having a plurality of chains attached at one end thereto which are adapted to be thrown sequentially into the space between the rotating tire of the vehicle and the supporting surface as the disk is driven by contact with the side wall of the tire so that each chain comes between the tire and the surface to diminish skidding of the tire on the surface, the improvement which comprises a disk cast of low density metal, a steel ring having the chains welded thereto and means securing the ring to the disk.

7. In an anti-skid device as set forth in claim 3 in which each twisted chain has an angular cross section.

8. In an anti-skid device as set forth in claim 7 in which the angular cross section is square.

9. A disk for an anti-skid device having a plurality of chains secured at one end thereto, the periphery of which will contact the side wall of a tire in use, and periphery having a sufficiently narrow width to spread a layer of water on the side wall and provide essentially dry, non-slipping contact of the periphery of the disk with the side wall of the tire instead of hydroplaning on it, said periphery in cross-section being semi-circular and connected by a diverging section having sloping walls above and below the semi-circle connecting it to the central portion of the disk to which the chains are attached at one end.

10. A disk as set forth in claim 9 in which the disk is cast low density metal and the periphery of the disk is covered with a layer of anti-skid material.

11. A disk as set forth in claim 9 in which the chains are twisted in the same direction a tire trends to twist them in use to substantially prevent further twisting as a tire rolls over it.

12. A disk as set forth in claim 9 in which the chains are welded at one end to a steel ring and the ring is fastened to the under surface of the disk.

13. A disk as set forth in claim 9 in which the disk has a ring fastened to its under surface and the chains are welded at one end to said ring.

14. A disk as set forth in claim 13 in which the places where chains are welded to the ring are substantially uniformly spaced.

* * * * *